United States Patent [19]

Rew

[11] 4,069,999
[45] Jan. 24, 1978

[54] SPRING TYPE DOGGING DEVICE
[75] Inventor: James A. Rew, Glen Burnie, Md.
[73] Assignee: The United States of America as represented by the Secretary of the Air Force, Washington, D.C.
[21] Appl. No.: 740,530
[22] Filed: Nov. 10, 1976
[51] Int. Cl.² .............................................. B25B 5/08
[52] U.S. Cl. ................................................... 248/507
[58] Field of Search .............. 248/510, 509, 508, 507, 248/506, 505, 504, 503, 500; 151/38; 85/5 P, 8.8; 24/261 A, DIG. 24, DIG. 28

[56] References Cited
U.S. PATENT DOCUMENTS

| | | | |
|---|---|---|---|
| 614,672 | 11/1898 | Sweigart | 151/38 |
| 1,066,495 | 7/1913 | Helvig et al. | 151/38 |
| 2,673,334 | 3/1954 | Julian et al. | 248/505 |
| 2,733,492 | 2/1956 | Copell | 248/507 |
| 2,734,545 | 2/1956 | Nothdurft | 151/38 |
| 3,323,772 | 6/1967 | DuPree et al. | 248/505 |
| 3,387,814 | 6/1968 | Fischer | 248/507 |
| 3,704,563 | 12/1972 | Waller | 248/507 |
| 3,787,024 | 1/1974 | Dzus | 248/507 |
| 3,966,163 | 6/1976 | Getzin | 24/261 R |

FOREIGN PATENT DOCUMENTS

| | | | |
|---|---|---|---|
| 2,131,730 | 12/1971 | Germany | 85/5 P |
| 589,078 | 2/1959 | Italy | 248/508 |
| 888,405 | 1/1962 | United Kingdom | 248/507 |

Primary Examiner—Marion Parsons, Jr.
Attorney, Agent, or Firm—Joseph E. Rusz; Arsen Tashjian

[57] ABSTRACT

A clamping device for securing a workpiece such as an electronic package to a support such as a heat sink. A curved slot is machined around a central opening in the body of a configurated flat metal clamp having an extending lip which contacts the edge of the workpiece. The central opening in the clamp body receives a hold down screw member which threadably engages the support. When the hold down screw is fully tightened against the support with the extending lip over the workpiece, the known clamping force predetermined by the thickness and configuration of the clamp body is applied. The need for a torque wrench and specific fastener torque values to prevent possible distortion of the surface of the heat sink is eliminated.

2 Claims, 5 Drawing Figures

SPRING TYPE DOGGING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to a clamping device and, more particularly, the invention is concerned with providing a means for releasably attaching an electronic module or the like to a support member such as a heat sink.

Heretofore, it has been the general practice to hold down electronic modules or the like against a support member such as a heat sink by means of a clamping device. In the case where a heat sink is utilized, the component module must be held in close intimate contact therewith in order to obtain the proper heat transfer characteristics. This means that the unit component is generally provided with a flanged portion in order to allow the clamping means to operate by engaging the flangs and pressing it against the heat sink. In the prior art, the clamping devices often failed under conditions of vibration or shock unless they were tightened down to a specific torque value. This necessitated the provision of a torque wrench for use in attaching the unit to the heat sink because excessive tightening to insure adequate contact with the heat sink would often distort the heat sink and cause loss of flatness with the corresponding loss of efficiency of the heat transfer process. Thus, it would be most desirable to provide a resilient clamping-device for securing an object to a flat surface with the desired, repeatable clamping force without the use of a torque wrench or any other special tools and without causing the support surface to become distorted.

SUMMARY OF THE INVENTION

The present invention is concerned with providing a clamping device which is useful for securing an electronic package to a heat sink wherein known clamping forces can be applied without the need for specifying fastener torquing values. The clamp is fabricated from a single, flat and generally circular in configuration piece of resilient metal having a central opening for receiving a hold-down bolt. A circular slot closed at one end is arranged around a major portion of the center hole with the open end of the slot extending tangentially to the outer edge of the clamp to form a lip portion which serves as the clamping edge. When the hold-down bolt is engaged in a threaded hole in the surface of the heat sink and fully tightened therein, the clamping edge exerts a uniform, predictable and repeatable clamping pressure on the electronic component.

Accordingly, it is an object of the invention to provide a spring type dogging device wherein a single, flat and generally circular shaped piece of metal is provided with a central hole and a surrounding slot for exerting a uniform, repeatable clamping force to attach an electronic component to the surface of a heat sink.

Another object of the invention is to provide a resilient clamping device for securing an object to a flat surface with a desired, repeatable clamping force without the use of a torque wrench or any other special tool.

Still another object of the invention is to provide a spring type dogging device which applies a known clamping force when tightened without distorting the mounting surface which would result in poor heat conduction from the mounted unit.

A further object of the invention is to provide an improved clamping device which is small, lightweight and inexpensive to manufacture and yet produces accurate clamping forces without the need for special tools or equipment.

A still further object of the invention is to provide a spring type dogging device wherein there is no need to specify torque values. The correct predetermined torque is applied by simply tightening the device fully.

These and other objects, features and advantages will become more apparent after considering the following detailed description taken in conjunction with the annexed drawings and appended claims.

DESCRIPTION OF A PREFERRED EMBODIMENT

Figure 1:
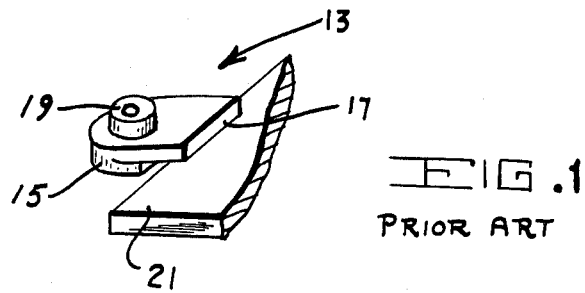
FIG. 1 is a view in isometric of a prior art clamping device used to secure electronic packages to a heat sink.
Figure 2:
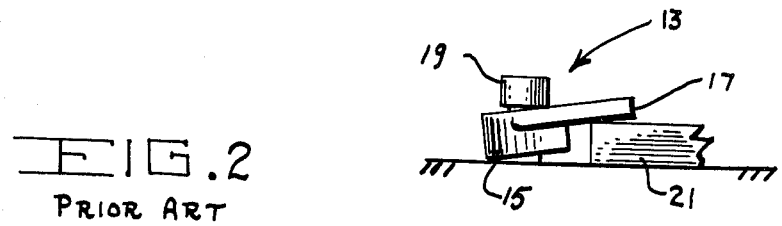
FIG. 2 is a side view of the prior art clamping device of FIG. 1 which may apply widely varying forces to the mounting surface causing possible distortion thereto.

Referring now to the drawings and particularly to FIGS. 1 and 2, there is shown a prior art clamping device 13 having a clamp body portion 15 and an extending lip portion 17. The body portion 15 is centrally drilled to receive a screw member 19 therethrough. The lip portion 17 is arranged to fit over the flanged portion 21 of an electronic component or the like. The threaded portion of the screw 19 is threadably received by the support (not shown) which, in practice, may be a heat sink.

It can be seen especially in FIG. 2 that the tightening of the screw 19 will provide widely varying clamping force on the flange 21. The torque value must be specified in order to prevent over tightening while applying sufficient force to retain the electronic component in position. Even when the clamping force is controlled by specifying fastener torques, unknown forces caused by dimensional inconsistencies and differences in surface finishes will generally result. Past experience has shown that some clamping forces were so high that the heat sink became distorted preventing a flat mounting surface from being presented to the heat producing electronic module.

Figure 3:
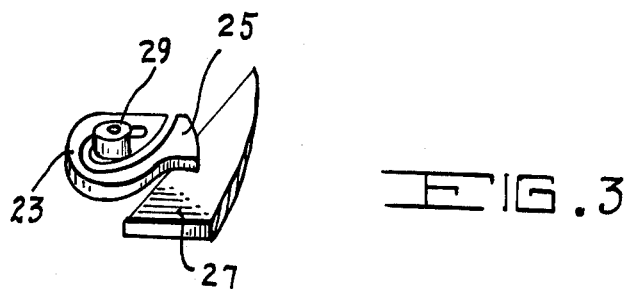
FIG. 3 is a general pictorial view of the improved clamping device according to the invention showing the hold-down bolt fully tightened with the clamp accurately applying a known, repeatable clamping force.
Figure 4:
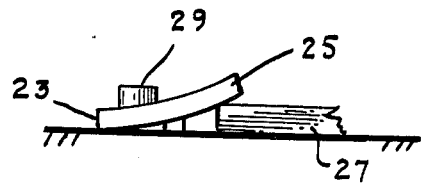
FIG. 4 is a side view of the improved clamping device of FIG. 3 showing the device in operating condition.
Figure 5:
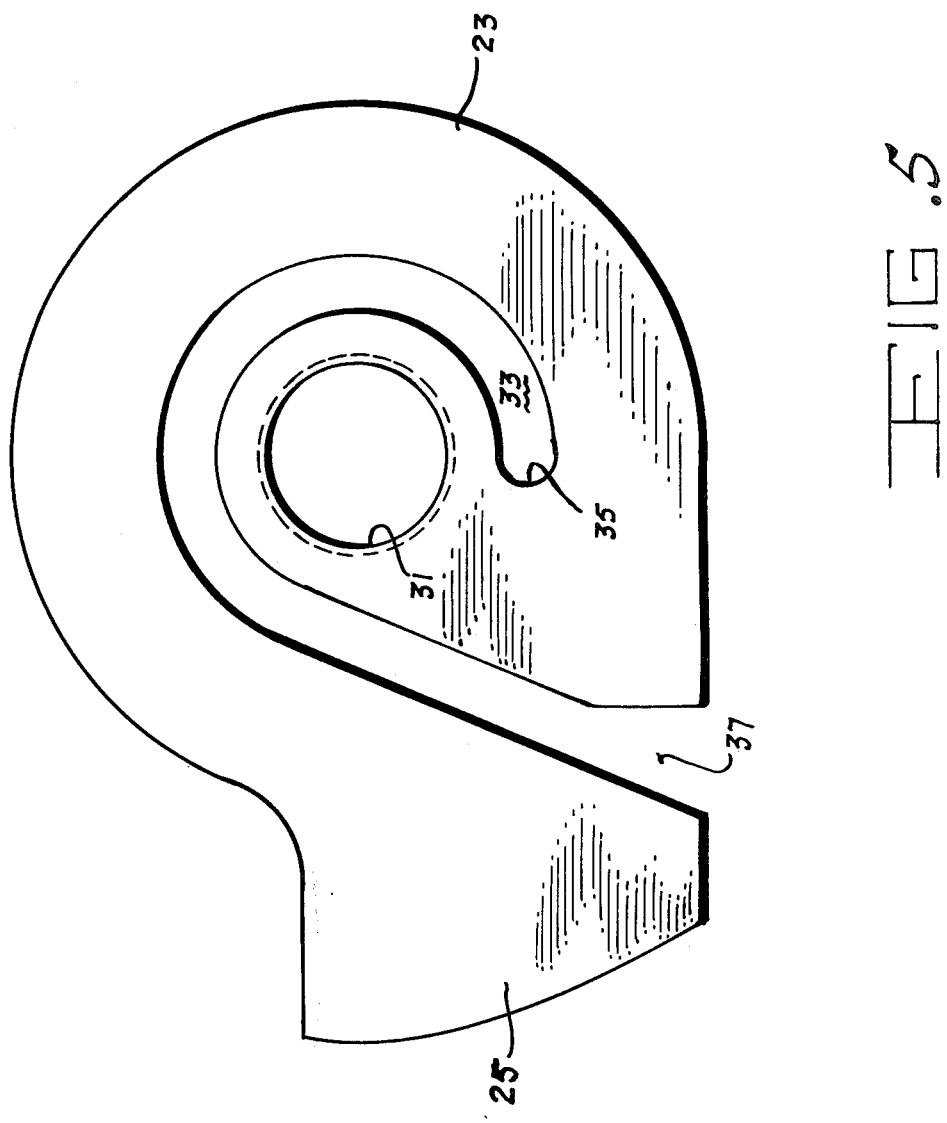
FIG. 5 is an enlarged top view of the design configuration of the flat spring type dogging device according to the invention showing the closed end circular slot around the central hole and extending outwardly to the lip area.

Referring now to FIGS. 3, 4 and 5, there is shown a spring type dogging device according to the present invention having a flat resilient body portion 23 with a clamping lip 25 arranged to contact the workpiece 27. The body portion 23 is secured to a fixed support such as a heat sink (not shown) by means of the screw member 29 which passes through the opening 31 (see FIG. 5) and threadably engages the heat sink.

The clamping lip 25 is arranged to overlie a flange on the workpiece 27. In the embodiment of the invention best shown in FIG. 5, a spiral slot 33 having a closed end 35 substantially surrounds the bolt hole 31 and provides a spiral ring of metal which makes up the body portion 23 of the clamp. The outermost extreme end of the spiral serves as the clamping lip 25. The outer end of the slot 33 terminates in the form of an open end 37 in the area of the clamping lip 25. When the hold down bolt 29 is engaged in a threaded hole in the surface of the heat sink and fully tightened, the clamping lip 25 exerts a uniform, predictable, repeatable clamping pressure on an object placed between it and a flat surface. Since the height of the workpiece 27 is known, the technique herein described can be used to design a resilient dogging device having a known clamping force. No torque wrench or other special tools are required to control the amount of force applied. The bolt 29 is fully tightened drawing the body 23 of the clamp in the region of the central hole 31, flat against the surface of the support member. With the clamping lip 25 against the workpiece 27, it is the thickness and configuration as well as the material properties which determine the actual clamping force being applied. The tightness of the screw 29 is not a controlling factor once it has been fully tightened.

Although the invention has been illustrated in the accompanying drawings and described in the foregoing specification in terms of a preferred embodiment thereof, the invention is not limited to this embodiment or to the particular configuration shown and described. It will be apparent to those skilled in the art that certain changes, modifications and substitutions can be made, particularly with respect to the shape and position of the spiral slot, without departing from the true spirit and scope of the appended claims.

Having thus set forth the nature of my invention, what I claim and desire to secure by Letters Patent of the United States is:

1. A spring type dogging device for releasably attaching a workpiece to a heat sink and the like comprising, a flat substantially circular body portion fabricated of flat resilient metal, a clamping lip forming a portion of the outer edge of said body portion and extending outwardly therefrom, said clamping lip arranged to engage an edge of the workpiece, a central opening in said body portion for receiving a screw member therethrough, and a spiral slot formed by removing a strip of resilient metal around a substantial portion of said central opening, said spiral slot being closed at the inner end and open at the outer end, the open outer end of said curved slot being located in the area of said clamping lip such that the remaining metal of the body portion forms a spiral configuration and operates to apply a uniform, predictable and repeatable downward force on the workpiece when the screw member in the central opening is fully tightened to hold the central section of the body portion securely against the surface of the heat sink.

2. The spring type dogging device defined in claim 1 wherein the width of said curved slot is less than one-half the width of the spirally configurated body portion formed by the remaining metal around the outer periphery of the slot.

* * * * *